United States Patent
Carter et al.

(10) Patent No.: US 10,701,022 B2
(45) Date of Patent: *Jun. 30, 2020

(54) INITIATING SOCIAL INTERACTION BASED ON E-MAIL CONTENT

(71) Applicant: International Business Machines Corporation, Armonk, NY (US)

(72) Inventors: Bernadette A. Carter, Raleigh, NC (US); Kathryn Lemanski-Mercer, Raleigh, NC (US); Cesar A. Wong, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/882,627

(22) Filed: Jan. 29, 2018

(65) Prior Publication Data

US 2018/0152412 A1    May 31, 2018

Related U.S. Application Data

(63) Continuation of application No. 14/036,371, filed on Sep. 25, 2013, now Pat. No. 9,942,188, which is a
(Continued)

(51) Int. Cl.
*H04L 12/58*    (2006.01)
(52) U.S. Cl.
CPC .......... *H04L 51/32* (2013.01); *H04L 51/063* (2013.01); *H04L 51/26* (2013.01)
(58) Field of Classification Search
CPC ...................................................... H04L 12/58
See application file for complete search history.

(56) References Cited

U.S. PATENT DOCUMENTS

| 7,509,382 B1 | 3/2009 | Jania et al. |
| 8,126,975 B2 | 2/2012 | Hoyne et al. |

(Continued)

FOREIGN PATENT DOCUMENTS

| CN | 101827067 A1 | 9/2010 |
| TW | 201248419 A1 | 12/2012 |
| TW | 201337582 A1 | 9/2013 |

OTHER PUBLICATIONS

U.S. Appl. No. 15/491,075, Final Office Action, dated Feb. 14, 2018, 13 pg.
(Continued)

*Primary Examiner* — David E Choi
(74) *Attorney, Agent, or Firm* — Cuenot, Forsythe & Kim, LLC

(57) ABSTRACT

Arrangements described herein relate to initiating social interaction based on e-mail content. Information associated with an e-mail being composed by a user can be analyzed to determine whether content of the e-mail is appropriate for incorporation into at least one social system. Responsive to determining that the content of the e-mail is appropriate for incorporation into at least one social system, a first option to enter the content of the e-mail in a first social system and a second option to enter the content of the e-mail in a second social system can be presented to the user. Responsive to the user selecting to enter the content of the e-mail in the first social system, a first entry in the first social system can be automatically created. The first entry can include the content of the e-mail composed by the user.

12 Claims, 3 Drawing Sheets

Related U.S. Application Data continuation of application No. 14/029,107, filed on Sep. 17, 2013, now Pat. No. 9,686,222.

(56) References Cited

U.S. PATENT DOCUMENTS

| | | | |
|---|---|---|---|
| 8,150,924 | B2 | 4/2012 | Buchheit et al. |
| 8,261,197 | B2 | 9/2012 | Lemay et al. |
| 8,892,666 | B1* | 11/2014 | Jackson ............... H04L 51/32 709/203 |
| 9,686,222 | B2 | 6/2017 | Carter et al. |
| 9,942,188 | B2 | 4/2018 | Carter et al. |
| 10,237,228 | B2 | 3/2019 | Carter et al. |
| 2001/0031075 | A1 | 10/2001 | Fujii |
| 2005/0246420 | A1* | 11/2005 | Little, II ............. G06Q 10/107 709/204 |
| 2009/0157819 | A1 | 6/2009 | Hampton |
| 2013/0006879 | A1* | 1/2013 | Ramanathan ........ G06Q 10/10 705/319 |
| 2013/0007148 | A1* | 1/2013 | Olsen .................. G06Q 10/101 709/206 |
| 2013/0159429 | A1 | 6/2013 | Nalliah et al. |
| 2013/0179237 | A1 | 7/2013 | Hull et al. |
| 2013/0290820 | A1* | 10/2013 | Dhanani ............... G06F 16/954 715/205 |
| 2014/0052795 | A1 | 2/2014 | Ta |
| 2015/0039761 | A1 | 2/2015 | Patil et al. |
| 2015/0058472 | A1* | 2/2015 | Jessee ................ H04L 41/0686 709/224 |
| 2015/0081807 | A1 | 3/2015 | Carter et al. |
| 2015/0082190 | A1* | 3/2015 | Carter .................. H04L 51/32 715/752 |
| 2017/0222967 | A1 | 8/2017 | Carter et al. |
| 2018/0152412 | A1* | 5/2018 | Carter .................. H04L 51/32 |

OTHER PUBLICATIONS

U.S. Appl. No. 15/491,075, Notice of Allowance, dated Nov. 2, 2018, 7 pg.

"System and Method to Prevent Email Branching Issues through Wiki Utilization is referenced by the Inventors in the Main Idea document," submitted by IBM to IP.com Prior Art Database, Disclosure No. IPCOM000180540D, Mar. 11, 2009, retrieved from the Internet: <http://ip.com/IPCOM/000180540>m 4 pg.

"Method to manage email threads through relocation to a discussion forum and elimination of continued email Delivery," "[online] submitted by IBM to IP.com Prior Art Database, Disclosure No. IPCOM00178279D, Jan. 21, 2009, retrieved from the Internet: <http://ip.com/IPCOM/000178279>, 3 pg."

U.S. Appl. No. 14/036,371 Non-Final Office Action, dated Jun. 18, 2015, 17 pg.

U.S. Appl. No. 14/036,371 Final Office Action, dated Nov. 9, 2015, 20 pg.

U.S. Appl. No. 14/036,371, Advisory Action, dated Feb. 1, 2016, 3 pg.

U.S. Appl. No. 14/036,371, Examiners Answer, dated Aug. 25, 2016, 10 pg.

U.S. Appl. No. 14/029,107 Non-Final Office Action, dated Feb. 2, 2016, 10 pg.

U.S. Appl. No. 14/029,107 Final Office Action, dated Aug. 1, 2016, 10 pg.

U.S. Appl. No. 14/036,371, Notice of Allowance, dated Feb. 13, 2017, 16 pg.

U.S. Appl. No. 14/036,371, Decision on Appeal, dated Oct. 3, 2017, 6 pg.

U.S. Appl. No. 14/036,371, Notice of Allowance, dated Nov. 27, 2017, 9 pg.

U.S. Appl. No. 15/491,075, Non-Final Office Action, dated Jul. 28, 2017, 13 pg.

* cited by examiner

300

```
┌─────────────────────────────────────────────────────────────┐
│ Analyze information associated with an e-mail being composed│
│ by a user to determine whether content of the e-mail is     │
│ appropriate for incorporation into at least one social      │
│ system                                                      │
│ 305                                                         │
└─────────────────────────────────────────────────────────────┘
                              ↓
┌─────────────────────────────────────────────────────────────┐
│ Responsive to determining that the content of the e-mail is │
│ appropriate for incorporation into at least one social      │
│ system, present to the user a first option to enter the     │
│ content of the e-mail in a first social system and a second │
│ option to enter the content of the e-mail in a second       │
│ social system                                               │
│ 310                                                         │
└─────────────────────────────────────────────────────────────┘
                              ↓
┌─────────────────────────────────────────────────────────────┐
│ Responsive to the user selecting to enter the content of the│
│ e-mail in the first social system, automatically create a   │
│ first entry in the first social system, the first entry    │
│ comprising the content of the e-mail composed by the user  │
│ 315                                                         │
└─────────────────────────────────────────────────────────────┘
                              ↓
┌─────────────────────────────────────────────────────────────┐
│ Within an e-mail client used by the user to compose the     │
│ e-mail, present to the user the first entry in the first    │
│ social system                                               │
│ 320                                                         │
└─────────────────────────────────────────────────────────────┘
                              ↓
┌─────────────────────────────────────────────────────────────┐
│ Permit the user to interact with the first social system to │
│ modify the first entry                                      │
│ 325                                                         │
└─────────────────────────────────────────────────────────────┘
                              ↓
┌─────────────────────────────────────────────────────────────┐
│ Responsive to the user selecting to post the first entry in │
│ the first social system, posting the first entry in the     │
│ first social system                                         │
│ 330                                                         │
└─────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Responsive to the user selecting to enter the content of the│
│ e-mail in the second social system, automatically create a  │
│ second entry in the second social system, the second entry │
│ comprising the content of the e-mail composed by the user  │
│ 335                                                         │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 3

INITIATING SOCIAL INTERACTION BASED ON E-MAIL CONTENT

CROSS-REFERENCE TO RELATED APPLICATIONS

This application is a continuation of application Ser. No. 14/029,107, filed on Sep. 17, 2013, which is fully incorporated herein by reference.

BACKGROUND

Arrangements described herein relate to electronic communications and, more particularly, to social networks.

The use of electronic mail (e-mail) has become the most common form of communication in enterprise. E-mail is used to digitally communicate messages from senders to one or more recipients. Other forms of communication used in enterprise include use of an instant messaging system, a text messaging system, an Internet forum, a blog and a social networking site. An instant messaging system supports online chats which offer real-time text transmission over a network, such as the Internet. A text messaging system supports communication of text based communications between communication devices, for example mobile phones. An internet forum (e.g., message board) is an online discussion site where people can hold conversations in the form of posted messages. Members in an internet forum often are at equal level, and content usually is segmented by topic. A blog also is an online discussion site, usually in control by a person who is the primary contributor of content, which may allow questions and comments from others. Social networking sites allow users to create contacts with other users, thereby building their social networks, and post messages for others in their social network to review, respond, share with others, etc.

BRIEF SUMMARY

One or more embodiments disclosed within this specification relate to initiating social interaction based on e-mail content.

A method includes analyzing, using a processor, information associated with an e-mail being composed by a user to determine whether content of the e-mail is appropriate for incorporation into at least one social system. Responsive to determining that the content of the e-mail is appropriate for incorporation into at least one social system, a first option to enter the content of the e-mail in a first social system and a second option to enter the content of the e-mail in a second social system can be presented to the user. Responsive to the user selecting to enter the content of the e-mail in the first social system, a first entry in the first social system can be automatically created. The first entry can include the content of the e-mail composed by the user.

A computer program product includes a computer readable storage medium having program code stored thereon. The program code is executable by a processor to perform a method. The method includes analyzing, using the processor, information associated with an e-mail being composed by a user to determine whether content of the e-mail is appropriate for incorporation into at least one social system. Responsive to determining that the content of the e-mail is appropriate for incorporation into at least one social system, using the processor, a first option to enter the content of the e-mail in a first social system and a second option to enter the content of the e-mail in a second social system can be presented to the user. Responsive to the user selecting to enter the content of the e-mail in the first social system, using the processor, a first entry in the first social system can be automatically created. The first entry can include the content of the e-mail composed by the user.

BRIEF DESCRIPTION OF THE SEVERAL VIEWS OF THE DRAWINGS

FIG. 3 is a flow chart illustrating a method of initiating social interaction based on e-mail content in accordance with another embodiment disclosed within this specification.

DETAILED DESCRIPTION

Figure 1:
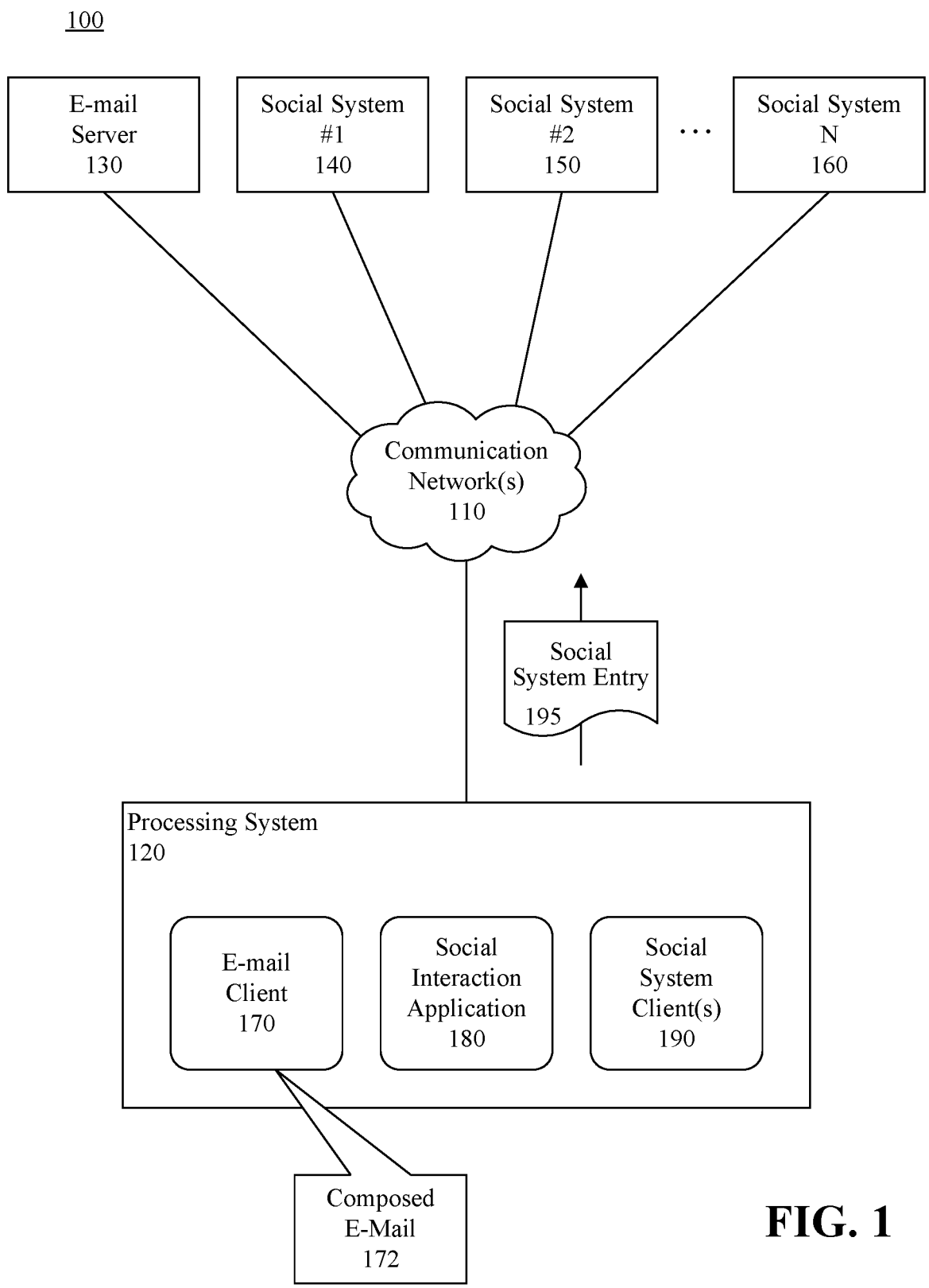
FIG. 1 is a block diagram illustrating a system for initiating social interaction based on e-mail content in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon. Any combination of one or more computer-readable medium(s) may be utilized. The computer-readable medium may be a computer-readable signal medium, a computer-readable storage medium, or a combination thereof.

As defined herein, the term "computer-readable storage medium" means a storage medium that contains or stores program code for use by or in connection with an instruction execution system, apparatus, or device. As defined herein, a "computer-readable storage medium" is not a transitory propagating signal per se. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to initiating social interaction based on electronic mail (e-mail) content. Information associated with an e-mail, being composed by a user, can be analyzed to identify whether content of the e-mail is appropriate for incorporation into at least one social system. If the content of the e-mail is appropriate for incorporation into at least one social system, options can be presented to the user to enter the content of the e-mail in a first social system and/or enter the content of the e-mail in a second social system. Responsive to the user selecting to enter the content of the e-mail in the first and/or second social system, respective entries in the first and/or second social systems can be automatically created. Such entry/entries can comprise the content of the e-mail.

Several additional definitions that apply throughout this document will now be presented.

As defined herein, the term "user" means a person (i.e., human being), for example a person using a device and/or system described herein.

As defined herein, the term "social system" means a system that supports communication between members of a social network. Examples of a social system include an instant messaging system, a text messaging system, an Internet forum, a blog, and a social networking site. As defined herein, an "e-mail system," per se, is not a social system. As defined herein, an "e-mail client," per se, is not a social system.

As defined herein, the term "information associated with an e-mail" means content entered into a body of an e-mail, content entered into a subject field of an e-mail, content attached to an e-mail, user identifiers entered into one or more recipient fields of an e-mail (e.g., "To,", "Cc" and/or "Bcc" fields), information entered into any other field or fields of an e-mail, or any other information associated with an e-mail.

As defined herein, the term "content" means any information entered into a body or subject field of an e-mail or in information attached to an e-mail. Content entered into a body of an e-mail may include, for example, text, one or more images, one or more hyperlinks, or the like. Content attached to an e-mail may include, for example, one or more documents, one or more text files, one or more images, one or more drawings, one or more files, and/or any other information that may be attached to an e-mail.

As defined herein, the term "compose" means to write and/or create.

FIG. 1 is a block diagram 100 illustrating a system 100 for initiating social interaction based on e-mail content in accordance with an embodiment disclosed within this specification. The system 100 can include a communication network 110 via which a processing system 120 may communicatively link to an e-mail server 130 and a plurality of social systems 140, 150, 160. The communication network 110 can be implemented as, or include, any of a variety of different networks such as a WAN, a LAN, a wireless network, a mobile network, a Virtual Private Network (VPN), the Internet, the Public Switched Telephone Network (PSTN), or the like.

The processing system 120 can be any processing system including a processor (e.g., central processing unit) and memory that is configured to communicate with the e-mail server 130 and the plurality of social systems 140, 150, 160 via the communication network 110. Examples of the processing system 120 include, but are not limited to a computer (e.g., a workstation, a desktop computer, a laptop computer, a notebook computer, a netbook, a tablet computer, a wearable computer, and the like) a smart phone, a personal digital assistant (PDA), a gaming device, a gaming system and a network appliance. The present arrangements are not limited to these examples, however.

The e-mail server 130 can be any processing system or systems configured to perform e-mail server functions, as is well known to those skilled in the art. Further, the social systems 140-160 can be hosted among one or more suitable configured processing systems. The social systems 140-160 can include, for example, one or more text messaging systems, one or more Internet forums, one or more blogs and/or one or more social networking sites.

In operation, an e-mail client 170 can receive one or more user inputs composing an e-mail 172. The e-mail client 170 can be executed on the processing system 120, executed on the e-mail server 130, or executed on another processing system to which the processing system 120 is communicatively linked. In this regard, the processing system 120 can receive user inputs to the e-mail client 170, and the e-mail client 170 can be hosted locally on the processing system 120, or hosted elsewhere. For instance, the e-mail client 170 can be hosted another a processing system to which the processing system 120 is communicatively linked. Such other processing system can be the system hosting the e-mail server 130, or another processing system, such as terminal server or other computer providing terminal services or e-mail client services to the processing system 120.

In one arrangement, a social interaction application 180 can be executed on the processing system 120, for example as a component of the e-mail client 170 or as another application hosted on the processing system 120. In another arrangement, the social interaction application 180 can be executed on a processing system hosting the e-mail server 130, for example as a component of the e-mail server 130 or as another application executed on the processing system hosting the e-mail server 130. The social interaction application 180 also can be hosted on any other processing system communicatively linked to the processing system 120 and the present arrangements are not limited in this regard.

In response to a user composing the e-mail 172 in the e-mail client 170, the social interaction application 180 can analyze information associated with the e-mail to determine whether content of the e-mail 172 is appropriate for incorporation into at least one social system 140-160. The content can include information entered into a body of the e-mail 172, information entered into a subject field of the e-mail 172 and/or content contained in a file attached to the e-mail 172.

Responsive to determining that the content of the e-mail 172 is appropriate for incorporation into at least one social system 140-160, the social interaction application 180 can present to the user a first option to enter the content of the e-mail 172 in the first social system 140 and a second option to enter the content of the e-mail 172 in the second social system 150. The social interaction application 180 also can present to the user one or more options to enter the content of the e-mail 172 in one or more other social systems 160. Notably, the options can be presented to the user within a view presented by the e-mail client 170, for example within a view presented in an InBox of the e-mail client 170. Accordingly, the user can select, from the InBox of the e-mail client 170, one or more social systems 140-160 in which the content of the e-mail 172 is to be entered. Moreover, the user can interact with such social systems 140-160 directly from the InBox of the e-mail client 170.

For example, from the InBox of the e-mail client 170, or another view presented by the e-mail client 170, the user can post status updates, activities, or the like via a social system entry 195. Moreover, responses to posts made by the user in the social systems 140-160, made as subsequent posts in a corresponding social system 140-160, also can be presented in the InBox, or other suitable view, of the e-mail client 170. From the InBox or another suitable view presented by the e-mail client 170, the user can view and respond to such responses posted in a corresponding social system 140-160.

In illustration, the e-mail client 170 can interact with the various social systems 140-160 and/or cooperate with respective social system clients 190 to present, in the InBox (or other suitable component) of the e-mail client 170, one or more views that enable the user to interact with the various social systems 140-160. Such operations can be enabled via one or more plugins to the e-mail client 170 or in any other suitable manner. In illustration, plugins can enable the e-mail client 170 to further function as a client to various social systems 140-160, or to interface with the various social system clients 190, in order to allow a user to interact with the social systems 140-160 directly from the InBox of the e-mail client 170, or any other interface of the e-mail client 170.

The order in which the options of the social system 140, the second social system 150 and/or the other social systems 160 are presented to the user can be determined based on prioritizing previous user selections of the social systems 140-160, previous user interactions with the social systems 140-160, interactions of the e-mail recipients with the social systems 140-160, etc.

For example, if the user generating the e-mail 172 tends to prefer a particular social system 140-160, based on analyzing the user's past preferences, a list of social systems 140-160 presented to the user can be prioritized to place at the top of the list a social system 140 most often used by the user. The list can include other social systems 150-160 available to the user, categorized based on the users use of such social systems 150-160. In this regard, the user's use of particular social systems 140-160 can be monitored over time and an emphasis can be provided in the prioritization based on recent trends by the user to use one or more of the social systems 140-160.

In another example, recipients indicated for the e-mail 172 can be identified. A determination can be made as to the social system 140-160 that the recipients indicated for the e-mail 172 are active participants, and which social systems 140-160 such recipients are most active. The list of social systems 140-160 presented to the user can be prioritized to place at the top of the list a social system 140 in which the recipients are most active. Further, the determination of the social systems 140-160 presented to the user can be based both on the participation of the recipients and the participation of the user in the social systems 140-160.

In another aspect, the social systems 140-160 for which the user is provided options to enter the content of the e-mail 172 can be selected based on prioritizing types of messages previously generated by, or received by, the user. For example, if the user tends to post messages in a particular forum more frequently than sending instant messages, the list of social systems 140-160 presented to the user can be prioritized to place at the top of the list a social system 140 that receives messages as posts, while social systems that receive instant messages, or other messages, can be indicated at lower places in the list.

In yet another aspect, the social systems 140-160 for which the user is provided options to enter the content of the e-mail 172 can be selected based on identifying recipients indicated in the e-mail 172 and determining which social system 140 or social systems 140-160 the recipients indicated in the e-mail 172 are active participants. Such social systems 140-160 can be prioritized based on participation of the recipients in the respective social systems 140-160. In illustration, if the social interaction application 180 identifies that recipients to the e-mail 172 predominantly participate in a particular forum, or are most active in a particular forum, that forum can be indicated at the top of the list provided to the user indicating the various social systems 140-160 from which the user is to select.

Further, the type of information being composed by the user can be analyzed to prioritize the social systems 140-160. For example, if the information is specific to a particular topic, and a particular social system includes a thread directed to that topic, that social system can be prioritized and indicated at a top of the social system list presented to the user. Moreover, the entry for the social system can provide a link directly to a thread for that particular topic. Accordingly, the user can be provided an option to enter the content of the e-mail 172 in that particular thread of the social system. If the information pertains to a particular topic, and the topic is not represented in a thread of one or more of the social systems 140-160, or the topic is represented in a thread of a social system 140-160 not selected by the user, the user can choose to create a new thread for the topic in the user chosen social system. Appropriate user interface elements can be presented by the e-mail client 170 to facilitate the user choices described herein.

Responsive to the user selecting to enter the content of the e-mail 172 in the first social system 140, the social interaction application 180 can automatically create a first entry in the first social system 140 via a respective social system client 190 which, as noted, can present a view in the e-mail client 170 through which the user interacts with the social system 140. The first entry can include the content of the e-mail 172 composed by the user. Further, the social system client 190 can permit the user to interact with the first social system 140 to modify the first entry. Responsive to the user selecting to post the first entry in the first social system 140, the social system client 190 can post the first entry in the first social system 140. In this case, the first entry can be posted in the first social system 140 with the user modifications. Otherwise, the first entry can be posted in the first social system 140 as originally entered into the e-mail 172.

Similarly, responsive to the user selecting to enter the content of the e-mail 172 in the second social system 150, the social interaction application 180 can automatically create a second entry in the second social system 150 via a respective social system client 190 which, as noted, can present a view in the e-mail client 170 through which the user interacts with the social system 150. The second entry can include the content of the e-mail 172 composed by the user. Further, the social system client 190 can permit the user to interact with the second social system 150 to modify the second entry. Responsive to the user selecting to post the second entry in the second social system 150, the respective social system client 190 can post the second entry in the second social system 150. In this case, the second entry can be posted in the second social system 150 with the user modifications. Otherwise, the second entry can be posted in the second social system 150 as originally entered into the e-mail 172.

In one aspect, the social system client 190 can be the same for the first social system 140, the second social system 150 and other social systems 160, or different clients can be provided. For example, the social system client 190 can be a web browser configured to interact with the respective social systems 140-160. In another aspect, one or more of the social systems 140-160 can be associated with respective social system clients 190 executing on the processing system 120, for example specific instant messaging clients, social networking application clients, or the like, in which case different social system clients 190 can be used by the user, via the e-mail client 170, to interact with different social systems 140-160.

Figure 2:
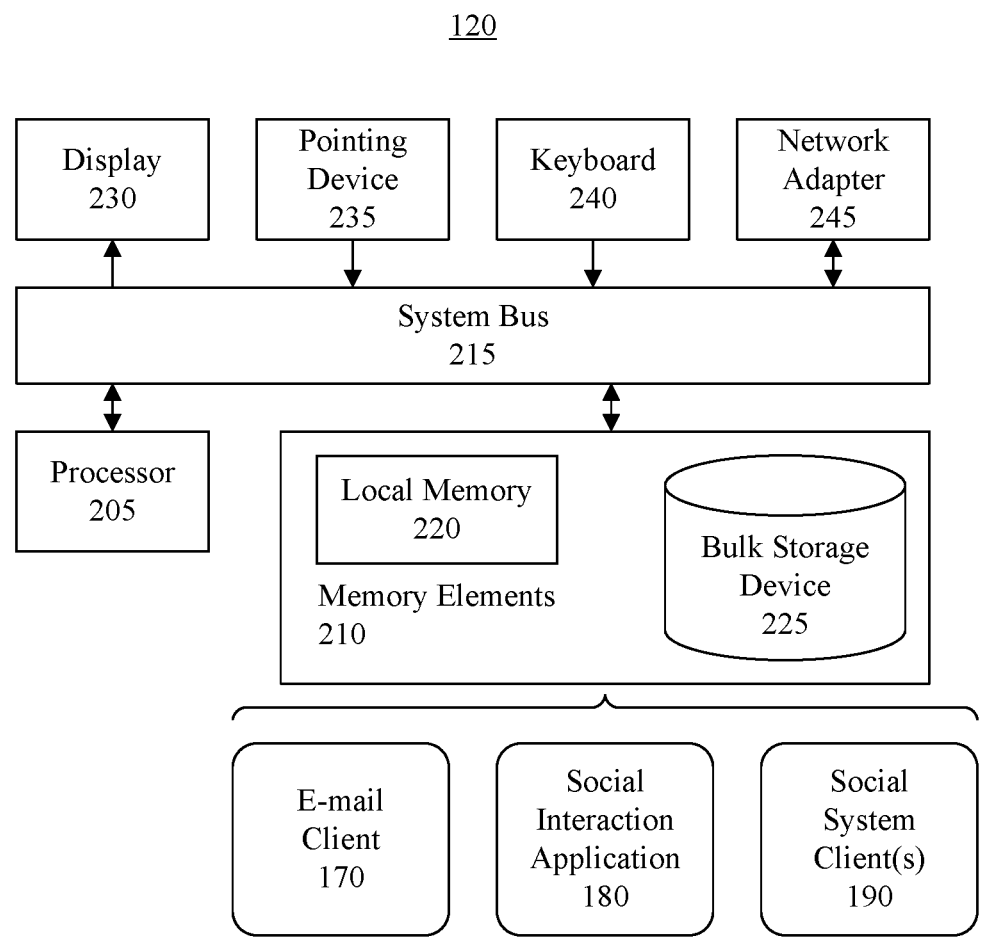
FIG. 2 is a block diagram illustrating a processing system for initiating social interaction based on e-mail content in accordance with an embodiment disclosed within this specification.

FIG. 2 is a block diagram illustrating a processing system 120 for initiating social interaction based on e-mail content in accordance with an embodiment disclosed within this specification. The processing system 120 can include at least one processor 205 (e.g., a central processing unit) coupled to memory elements 210 through a system bus 215 or other suitable circuitry. As such, the processing system 120 can store program code within the memory elements 210. The processor 205 can execute the program code accessed from the memory elements 210 via the system bus 215. It should be appreciated that the processing system 120 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 120 also can include one or more cache memories (not shown) that provide temporary storage of at least some program code in order to reduce the number of times program code must be retrieved from the bulk storage device 225 during execution.

Input/output (I/O) devices such as a display 230, a pointing device 235 and, optionally, a keyboard 240 can be coupled to the processing system 120. The I/O devices can be coupled to the processing system 120 either directly or through intervening I/O controllers. For example, the display 230 can be coupled to the processing system 120 via a graphics processing unit (GPU), which may be a component of the processor 205 or a discrete device. One or more network adapters 245 also can be coupled to processing system 120 to enable processing system 120 to become coupled to other systems, computer systems, remote printers, and/or remote storage devices through intervening private or public networks. Modems, cable modems, transceivers, and Ethernet cards are examples of different types of network adapters 245 that can be used with processing system 120.

As pictured in FIG. 2, the memory elements 210 can store the components of the processing system 120, namely the e-mail client 170, the social interaction application 180 and the social system client(s) 190. Being implemented in the form of executable program code, these components of the processing system 120 can be executed by the processing system 120 (e.g., via the processor 205) and, as such, can be considered part of the processing system 120. Moreover, the e-mail client 170, the social interaction application 180 and the social system client(s) 190 are functional data structures that impart functionality when employed as part of the processing system 120.

FIG. 3 is a flow chart illustrating a method 300 of initiating social interaction based on e-mail content in accordance with another embodiment disclosed within this specification. At step 305, information associated with an e-mail being composed by a user can be analyzed to determine whether content of the e-mail is appropriate for incorporation into at least one social system.

At step 310, responsive to determining that the content of the e-mail is appropriate for incorporation into at least one social system, a first option can be presented to the user to enter the content of the e-mail in a first social system and a second option can be presented to the user to enter the content of the e-mail in a second social system. In one arrangement, the user can be presented an option to enter the content of the e-mail in a particular thread of the first social system.

In one aspect, the first social system and the second social system can be selected based on prioritizing previous user selections of the first social system and the second social system. In another aspect, the first social system and the second social system can be selected based on prioritizing types of messages previously generated by, or received by, the user. In another aspect, recipients indicated for the e-mail can be identified, and a determination can be made that the recipients indicated for the e-mail are active participants in the first social system and/or the second social system.

At step 315, responsive to the user selecting to enter the content of the e-mail in the first social system, a first entry in the first social system can be automatically created. The first entry can include the content of the e-mail composed by the user.

At step 320, within an e-mail client used by the user to compose the e-mail, the first entry in the first social system can be presented to the user. At step 325, the user can be permitted to interact with the first social system to modify the first entry. At step 330, responsive to the user selecting to post the first entry in the first social system, the first entry can be posted in the first social system. If the user modifies the first entry, the first entry can be posted with the user modifications.

Optionally, at step 335, responsive to the user selecting to enter the content of the e-mail in the second social system, a second entry can be automatically created in the second social system. The second entry also can include the content of the e-mail.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
analyzing information associated with an e-mail being composed by a user to determine whether content of the e-mail is appropriate for incorporation into at least one social system;
responsive to determining that the content of the e-mail is appropriate for incorporation into at least one social system, presenting to the user a first option to enter the content of the e-mail in a first social system and a second option to enter the content of the e-mail in a second social system; and responsive to the user selecting to enter the content of the e-mail in the first social system, automatically creating a first entry in the first social system, the first entry comprising the content of the e-mail composed by the user.

2. The system of claim 1, wherein presenting to the user the first option to enter the content of the e-mail in the first social system and the second option to enter the content of the e-mail in the second social system comprises:

selecting the first social system and the second social system based on prioritizing previous user selections of the first social system and the second social system.

3. The system of claim 1, wherein presenting to the user the first option to enter the content of the e-mail in the first social system and the second option to enter the content of the e-mail in the second social system comprises:

selecting the first social system and the second social system based on prioritizing types of messages previously generated by, or received by, the user.

4. The system of claim 1, wherein presenting to the user the first option to enter the content of the e-mail in the first social system and the second option to enter the content of the e-mail in the second social system comprises:

identifying recipients indicated for the e-mail; and determining that the recipients indicated for the e-mail are active participants in at least one social system selected from a group comprising the first social system and the second social system.

5. The system of claim 1, wherein presenting to the user the first option to enter the content of the e-mail in the first social system comprises:

presenting to the user the first option to enter the content of the e-mail in a particular thread of the first social system.

6. The system of claim 1, the executable operations further comprising:

responsive to the user selecting to enter the content of the e-mail in the second social system, creating a second entry in the second social system, the second entry comprising the content of the e-mail.

7. A computer program product comprising a computer readable storage medium having program code stored thereon, the program code executable by a processor to perform a method comprising:

analyzing, using the processor, information associated with an e-mail being composed by a user to determine whether content of the e-mail is appropriate for incorporation into at least one social system;

responsive to determining that the content of the e-mail is appropriate for incorporation into at least one social system, presenting to the user, using the processor, a first option to enter the content of the e-mail in a first social system and a second option to enter the content of the e-mail in a second social system; and responsive to the user selecting to enter the content of the e-mail in the first social system, using the processor, automatically creating a first entry in the first social system, the first entry comprising the content of the e-mail composed by the user.

8. The computer program product of claim 7, wherein presenting to the user the first option to enter the content of the e-mail in the first social system and the second option to enter the content of the e-mail in the second social system comprises:

selecting the first social system and the second social system based on prioritizing previous user selections of the first social system and the second social system.

9. The computer program product of claim 7, wherein presenting to the user the first option to enter the content of the e-mail in the first social system and the second option to enter the content of the e-mail in the second social system comprises:

selecting the first social system and the second social system based on prioritizing types of messages previously generated by, or received by, the user.

10. The computer program product of claim 7, wherein presenting to the user the first option to enter the content of the e-mail in the first social system and the second option to enter the content of the e-mail in the second social system comprises:

identifying recipients indicated for the e-mail; and determining that the recipients indicated for the e-mail are active participants in at least one social system selected from a group comprising the first social system and the second social system.

11. The computer program product of claim 7, wherein presenting to the user the first option to enter the content of the e-mail in the first social system comprises:

presenting to the user the first option to enter the content of the e-mail in a particular thread of the first social system.

12. The computer program product of claim 7, the method further comprising:

responsive to the user selecting to enter the content of the e-mail in the second social system, creating a second entry in the second social system, the second entry comprising the content of the e-mail.

* * * * *